United States Patent Office 3,706,077
Patented Dec. 12, 1972

3,706,077
MULTIPROCESSOR TYPE INFORMATION PROCESSING SYSTEM WITH CONTROL TABLE USAGE INDICATOR
Takashi Mori, Kawasaki, and Tatsuya Yoshikawa, Tokyo, Japan, assignors to Fujitsu Limited, Kawasaki, Japan
Filed Jan. 6, 1971, Ser. No. 104,206
Claims priority, application Japan, Jan. 12, 1970, 45/3,356
Int. Cl. G06f 15/16
U.S. Cl. 340—172.5
4 Claims

ABSTRACT OF THE DISCLOSURE

An indicator indicates whether a control table utilized in the execution of a control program is being occupied by a processor, each of a plurality of processors being subject to control programs. Each of the processors includes a control for initially checking the indication of the indicator when a processor is to utilize a control table and permits the utilization of the control table when the checking indicates that the control table is not occupied by another processor.

DESCRIPTION OF THE INVENTION

The invention relates to a multiprocessor type information processing system. More particularly, the invention relates to a processing system in a multiprocessor type information processing system.

This type of processing system is an electronic computer system comprising a plurality of processors and is known as a symmetric type multiprocessor system.

In an electronic computer system comprising a plurality of processors, a plurality of general programs are simultaneously stored in the main memories and are processed by an idle one of the plurality of processors in accordance with an order of priority. The computer system also utilizes a plurality of control programs or special programs for controlling the order of processing of the general program and the processing in the input-output devices. The control programs themselves provide the supervision. The starting, interruption and ending of the general program are controlled by the control program, but the starting, interruption and ending of the control program are not so controlled. The control programs are also stored in the main memories.

The general programs and the control programs are always accompanied by control tables which store various types of conditions and parameters necessary for the programs. The control tables control the condition of materials in the input-output devices and main memories, and the sequence of the programs, and are always utilized in a multi-program system. There are various types of control tables. Some control tables are provided with a general program. Other control tables are provided in correspondence with a processor. Still other control tables are provided in common with a group of control programs. The control tables are stored in the main memories, as are the general programs and the control programs.

Mutual interference of control tables within a general program cannot occur, since none of the general programs is simultaneously executed by a plurality of processors. Mutual interference does occur, however, in a control program. Control programs are utlized by a plurality of processors at arbitrary times, rather than at determined times, so that a single control program may be frequently utilized simultaneously by a plurality of processors. The simultaneous utilization of a control program, utilizing no control table, by a plurality of processors does not result in confusion. When control tables are utilized in the control program, however, mutual interference occurs.

In the aforedescribed type of system, therefore, there is generally an indication within the control program indicating whether or not the control program is then being utilized by a processor. The purpose of the indication is to prevent mutual interference between control processors. The system is known as a routine lock system. The routine lock system prevents mutual interference by providing a lock signal indication in connection with a control program or a group of control programs and preventing the simultaneous execution of the program or group of programs. In such a known system, since a control program untilizing control tables cannot be simultaneously executed in a plurality of processors, information processing in those processors which cannot execute the program must be temporarily stopped. The performance of the system as a whole therefore decreases in effectiveness and efficiency.

The principal object of the invention is to provide a new and improved processing system in a multiprocessor type information processing system, which has an increased effectiveness and efficiency relative to known processing systems of similar type.

It is assumed that, for example, a post program, which is a type of control programs, is locked. In this case, while a processor is executing the post program, the other processors must wait. This means that the locking factor is in effect.

In accordance with the invention, the aforedescribed disadvantage of the known processing system is eliminated by providing the locking means for preventing simultaneous execution within the control table rather than the control program. In utilizing the control table, the locking means is first scanned. If it is determined that the control table is not locked, the control table is utilized. This increases the possibility for simultaneous execution of a control program and improves the performance of the computer system.

The system of the invention may be known as a table lock system. In the table lock system, a lock signal indication is provided in correspondence with a control table and a lock test is undertaken in utilizing the control table.

In accordance with the invention, a multiprocessor type information processing system has a plurality of processors controllable by control programs utilizing control tables in their execution. The multiprocessor type information processing system has a processing system which comprises indicating means for indicating whether a control table utilized in the execution of a control program is being utilized by a processor. Each of the processors includes control means for initially checking the indication of the indicating means when a processor is to utilize a control table and for permitting the utilization of the control table when the checking result indicates that the control table is free from utilization by another processor.

In one embodiment of the invention, the indicating means comprises a lock signal indication in each control table.

In another embodiment of the invention, the indicating means comprises flip flop means in each of the processors.

In order that the invention may be readily carried into effect, it will now be described with reference to the accompanying drawings, wherein.

In the figures, the same components are identified by the same reference numerals.

Figure 1:
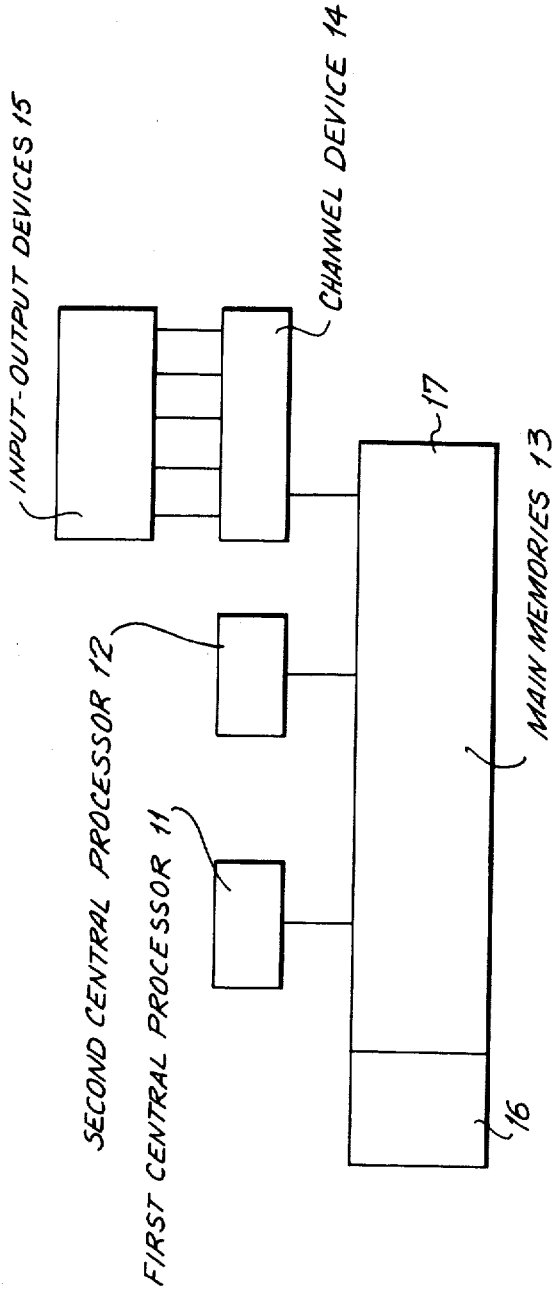
FIG. 1 is a schematic block diagram of a prior art multiprocessor type information processing system having a plurality of processors.

The system illustrated in FIG. 1 is representative of the symmetric type multiprocessor system wherein two processors commonly utilize all the main memories and the channel device commonly utilizes all the main memories. A first central processor 11 and a second central processor 12 are thus connected to the main memories 13. A channel device 14 is connected to the main memories 13 and a plurality of input-output devices 15 are connected to the channel device 14.

Control programs and control tables are stored in a part 16 of the main memories 13. General programs are stored in a part 17 of the main memories 13. Data, such as operands and the results of the operations, are, of course, also stored in the main memories 13. The symmetric type multiprocessor system of FIG. 1 functions to simultaneously execute a single program in a plurality of processors.

Figure 2:
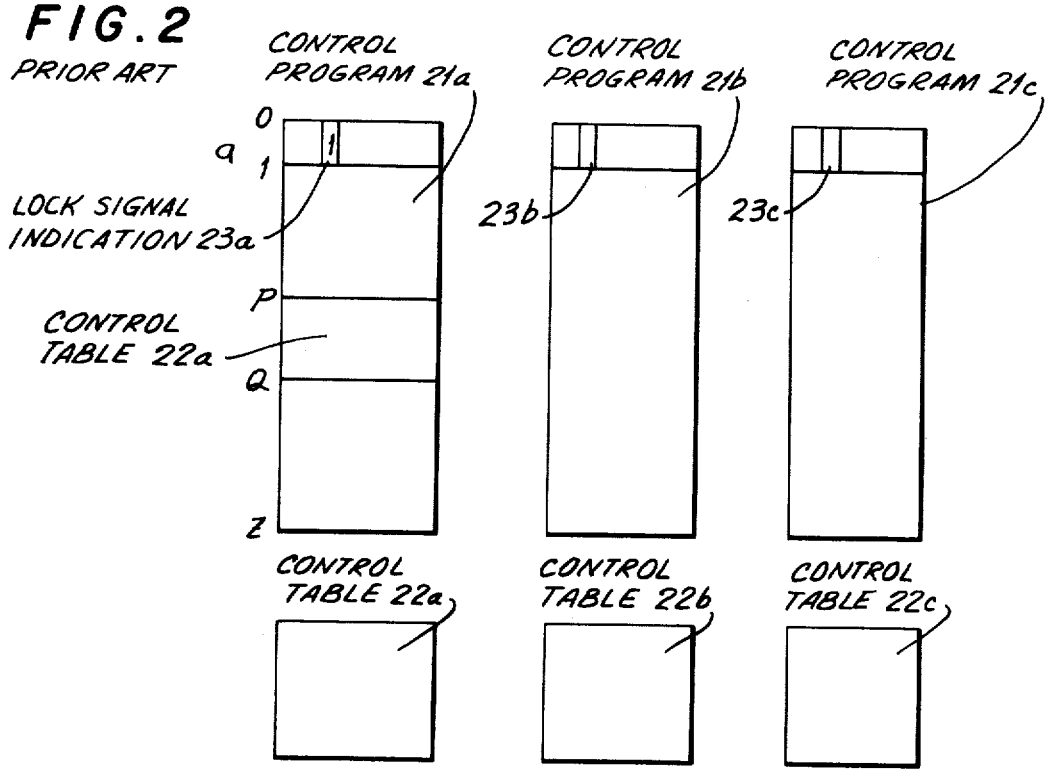
FIG. 2 is a schematic diagram illustrating the fundamental principles of a known type of lock system.

FIG. 2 aids in explaining a known lock system. In FIG. 2, a plurality of control programs 21a, 21b and 21c, and a plurality of control tables 22a, 22b and 22c are provided. The control tables 22a, 22b and 22c are utilized by the control programs 21a, 21b and 21c, respectively. The control programs 21a, 21b and 21c and the control tables 22a, 22b and 22c are stored in the part 16 of the main memories 13 (FIG. 1).

A lock signal indication 23a is provided in the first step O of the control program 21a. A lock signal indication 23b is provided in the first step O of the control program 21b. A lock signal indication 23c is provided in the first step O of the control program 21c. Each of the lock signal indications 23a, 23b and 23c displays, indicates, shows, records, or the like, whether or not the control program in which it appears is being executed.

The control program 21a is discussed, since it is representative of each of the control programs. In the control program 21a, the lock signal indication 23a indicates, records, shows, displays, or the like, "1." The "1" indication or display of the lock signal indication 23a indicates that the control program 21a is being executed by a specific processor. As shown in FIG. 2, the control table 22a is utilized by the control program 21a only between the steps P and Q of said control program. The control table 22a is thus utilized only between the steps P and Q of all the steps O to Z of the control program 21a. Mutual interference of the control table 22a may thus be prevented if the other processors are caused to wait only between the steps P and Q. Actually, however, since the lock signal indication 23a is "1," the other processors cannot execute the control program 21a, and must wait until the processor executing said control program completes the execution of all the steps O to Z of said control program and changes the lock signal indication 23a to "O."

Figure 3:
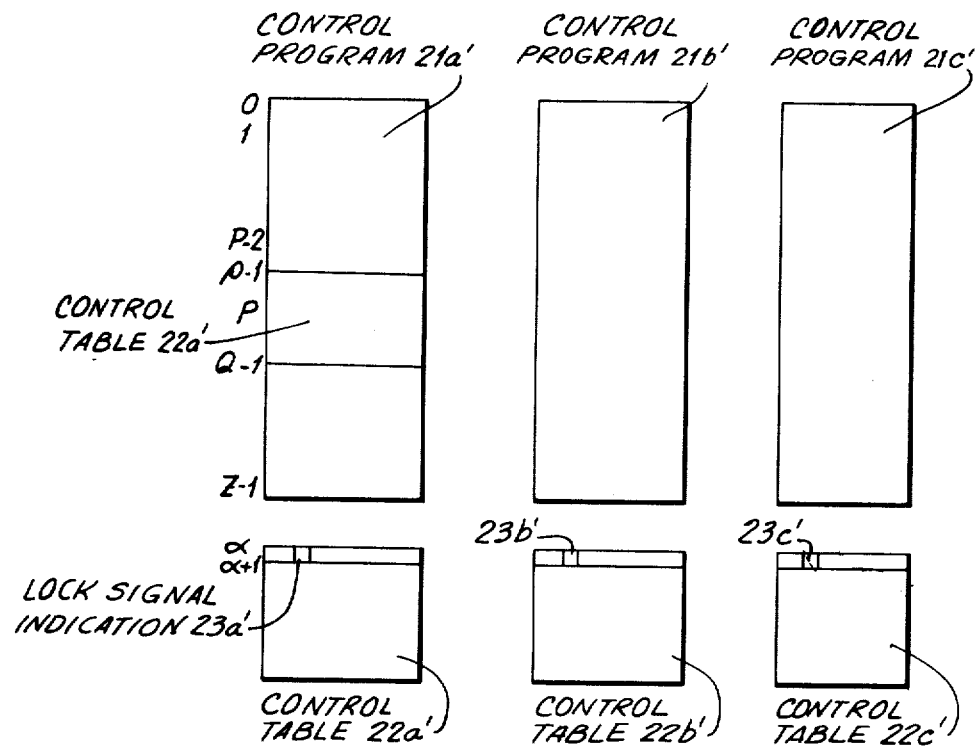
FIG. 3 is a schematic diagram illustrating the fundamental principles of an embodiment of the table lock system of the invention.

FIG. 3 illustrates an embodiment of the table lock system of the invention. As in FIG. 2, a plurality of control programs 21a', 21b' and 21c' are provided with corresponding control tables 22a', 22b' and 22c'. The control program 21a' thus utilizes the control table 22a', the control program 21b' utilizes the control table 22b' and the control program 21c' utilizes the control table 22c'. The control programs 21a', 21b' and 21c' are stored in the part 16 of the main memories 13 (FIG. 1).

In FIG. 3, unlike FIG. 2, the lock signal indications 23a', 23b' and 23c' are provided in the first steps of the control tables 22a', 22b' and 22c', respectively. Thus, the lock signal indication 23a' is provided in the first step α of the control table 22a'. The lock signal indication 23b' is provided in the first step α of the control table 22b'. The lock signal indication 23c' is provided in the first step α of the control table 22c'.

As in the discussion of FIG. 2, the control program 21a' is discussed in FIG. 3, since it is illustrative of each of the control programs. As shown in FIG. 3, the control table 22a' is utilized between the steps P–1 and Q–1 of all the steps O to Z–1 of the control program 21a'. In the embodiment illustrated in FIG. 3, during the period that a specific processor is executing the control program 21a', another processor is not prevented from executing the same control program 21a'. When another processor executing the control program 21a' reaches the step P–1 of said control program, the lock signal indication 23a' of the control table 22a' is scanned, detected, investigated, examined, or the like, by the processor.

If the other processor determines that the lock signal indication 23a' is "1," this indicates that the control table 22a' is, at such time, being utilized by a specific processor, as well as the other processor. In such case, the other processor is caused to wait until the control table 22a' has been scanned and the lock signal indication 23a' has been changed to "O." When the lock signal indication 23a' is changed to "O," the other processor, which has provided the determination of said lock signal indication, may commence the execution of the control program 21a' utilizing the control table 22a'.

Thus, in the table lock system of the invention, as illustrated in FIG. 3, a plurality of processors may execute the control program 21a' simultaneously as long as the processors do not utilize the control table 22a' simultaneously. This, of course, applies to each of the control programs and its corresponding control table. Only during the period that a processor executes the steps P–1 to Q–1 of the control program, is another processor caused to wait. Therefore, in accordance with the table lock system of the invention, the waiting time is considerably reduced and the performance, effectiveness and efficiency of the processors are considerably improved.

Figure 4:
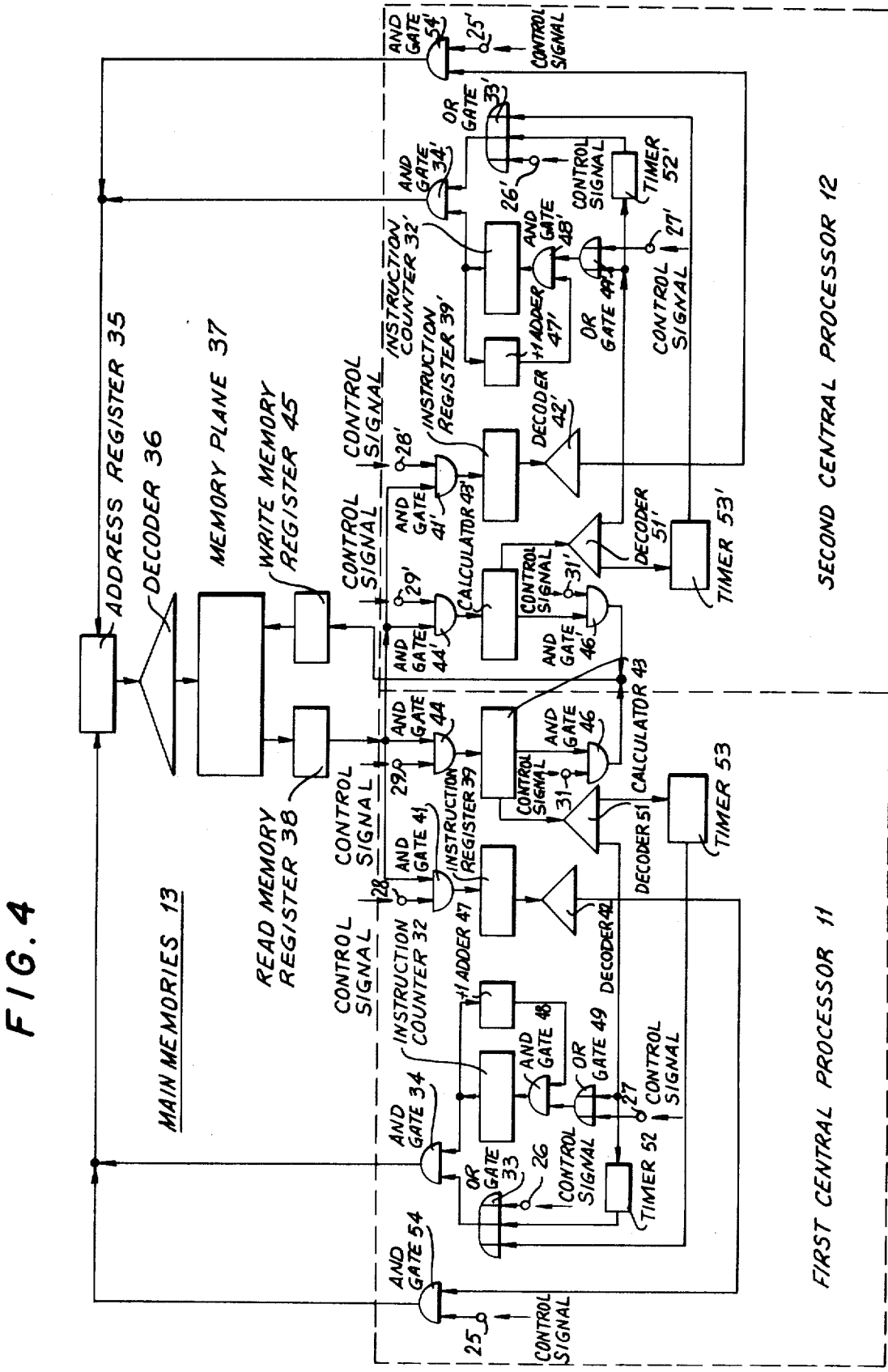
FIG. 4 is a block diagram of the embodiment of the table lock processing system of the invention illustrated in FIG. 3.

FIG. 4 illustrates the embodiment of the table lock system of the invention described with reference to FIG. 3. In FIG. 4, the main memories 13, the first central processor 11 and the second central processor 12 correspond to the same components illustrated in FIG. 1. In FIG. 4, a plurality of input terminals 25, 26, 27, 28, 29 and 31 and 25', 26', 27', 28', 29' and 31' are provided. Each of the input terminals 25 to 31 and 25' to 31' is supplied with a control signal.

It is assumed that the first central processor 11 is executing the control program 21a' of FIG. 3. The address of the step O of the control program 21a' is set in an instruction counter 32. When a control signal is supplied to the input terminal 26, it switches an OR gate 33 to its conductive condition and switches an AND gate 34 to its conductive condition. The address of the step O set in the instruction counter 32 is then set in an address register 35 of the main memories 13.

The address set in the address register 35 is decoded by a decoder 36 and the instruction or order of the step O stored in the address is read out from a memory plane 37 to a read memory register 38. When a control signal is supplied to the input terminal 28, the order or instruction of the step O, read out to the read memory register 38, is set in an instruction register 39 via and AND gate 41. The order or instruction set in the instruction register 39 is decoded by a decoder 42, and the first central processor 11 performs processing as instructed by the order or instruction of the step O in accordance with the result of the decoding by said decoder.

It is now assumed that the order or instruction of the step O is, for example, to read out data stored in the memory plane 37 and perform a calculation. When a control signal is supplied to the input terminal 25, the aforedescribed address, set in the instruction register 39 as part of the instruction of the step O, is set in the address register 39. The data stored in the address of the memory plane 37 is read out to the read memory register 38. When a control signal is supplied to the input terminal 29, the data is transferred to a calculator 43 via an AND gate 44. The calculator 43 then performs the calculation.

When a control signal is supplied to the input terminal 31, the result of the calculation performed by the calculator 43 is transferred to a write memory register 45 via an AND gate 46, and is written into the memory plane 37 from said write memory register. The aforedescribed operation completes the execution of the order or instruction of the step O. +1 adder 47 adds +1 to the address of the step O previously set in the instruction counter 32. When a control signal is supplied to the input terminal 27, the new address is transferred to the instruction counter 32 via an AND gate 48 as the address of the step 1. The steps 1 to P–2 are then executed in the aforedescribed manner.

The order or instruction of the step P–1 of the control program 21a' (FIG. 3) is then read out of the memory plane 37 and is set in the instruction register 39. This order or instruction is an instruction to utilize the control table 22a' (FIG. 3), so that when a control signal is supplied to the input terminal 25, the address of the step α of said control table is transferred to the address register 35. The address of the step α set in the address register 35 is decoded by the decoder 36 and the data of said step, stored in the memory plane 37, is read out to the read memory register 38. The data of the step α, as shown in FIG. 3, also includes the lock signal indication 23a'.

When a counter signal is supplied to the input terminal 29, the data read out to the read memory register 38 is transferred to the calculator 43 via the AND gate 44. The calculator 43 checks or determines whether the lock signal indication 23a' is "1" or "O." If the calculator 43 determines that the lock signal indication 23 a'is "O," this indicates that the control table 22a' is not being utilized by the other central processor. An OR gate 49 and the AND gate 48 are switched to their conductive conditions by a decoder 51. +1 is added to the indication of instruction counter 32, and the address of the step P of the control program 21a' is set in said instruction counter.

+1 is ordinarily automatically added to the indication of the instruction counter 32 when a control signal is supplied to the input terminal 27. In the execution of the step P–1 of the control program 21a' (FIG. 3), however, the supply of the control signal to the input terminal 27 is prevented by suitable means, not shown in FIG. 4. The signal from the decoder 51 also starts a timer 52. When a constant period of time has elapsed after the timer 52 is started, said timer produces an output signal. The constant period of time is equal to a period of time between the starting of the timer 52 and the setting of the address of the step P in the instruction counter 32 via the OR gate 49. The signal produced by the timer 52 switches the OR gate 33 and the AND gate 34 to their conductive conditions to set the address of the step P, set in the instruction counter 32, in the address register 35.

The steps P to Q–1 of the control program 21a' are then executed in the same manner as the steps O to P–2 (FIG. 3). While the control table 22a' (FIG. 3) is utilized by the first central processor 11, the lock signal indication 23a' must be "1," so that said control table may not be utilized by the other central processor, and said lock signal indication may be set to "1" in the step P. After the completion of the utilization of the control table 22a', the lock signal indication 23a' may be made "O" in the step Q–1 (FIG. 3), so that said control table may be utilized by the other central processor. This is similar in method to the writing of ordinary data in the memory plane 37.

If the lock signal indication 23a' of the data of the step α of the control table 22a' (FIG. 3) is "1," the calculator 43 determines that said control table is then utilized by the other central processor, and is locked. In this case, a timer 53 is started by the decoder 51. After a constant period of time, the timer 53 produces an output signal. The constant period of time is equal to the period of time during which the control table 22a' (FIG. 3) is utilized by the other central processor; that is, the period of time during which the steps P–1 to Q–1 (FIG. 3) of the control program are executed by the other central processor.

When the lock signal indication 23a' (FIG. 3) is "1," the indication of the instruction counter 32 is not changed and designates the address of the step P–1 of the control program 21a' (FIG. 3). The OR gate 33 and the AND gate 34 are switched to their conductive conditions by the output signal from the timer 53. The address of the step P–1 is again set in the address register 35, the instruction of the step P–1 is read out of the memory plane 37, and an operation is performed in the same manner as in the previous execution of the instruction of said step. In this case, however, the lock signal indication 23a' of the step α of the control table 22a' (FIG. 3) is "O," since the other central processor is not utilizing said control table, and is therefore not utilizing the instructions of the step P thereof. The subsequent steps may be executed by the utilization of the control table 22a'.

If the lock signal indication 23a' is "1," even after the repeated execution of the instructions of the step P–1 of the control program 21a' (FIG. 3), the timer 53 is again started. After a constant period of time, the instruction of the step P–1 is again executed. Although the execution of the control program 21a' (FIG. 3) by the first central processor 11 has been hereinbefore described, said control program may be executed by the second central processor 12 and the channel device 14 (FIG. 1) in exactly the same manner. The other control programs 21b' and 21c' (FIG. 3) may also be executed in the same manner.

The output of the decoder 42 and the input terminal 25 are connected to corresponding inputs of an AND gate 54. The output of the AND gate 54 is connected in common with the output of the AND gate 34 to an input of the address register 35.

Figure 5:
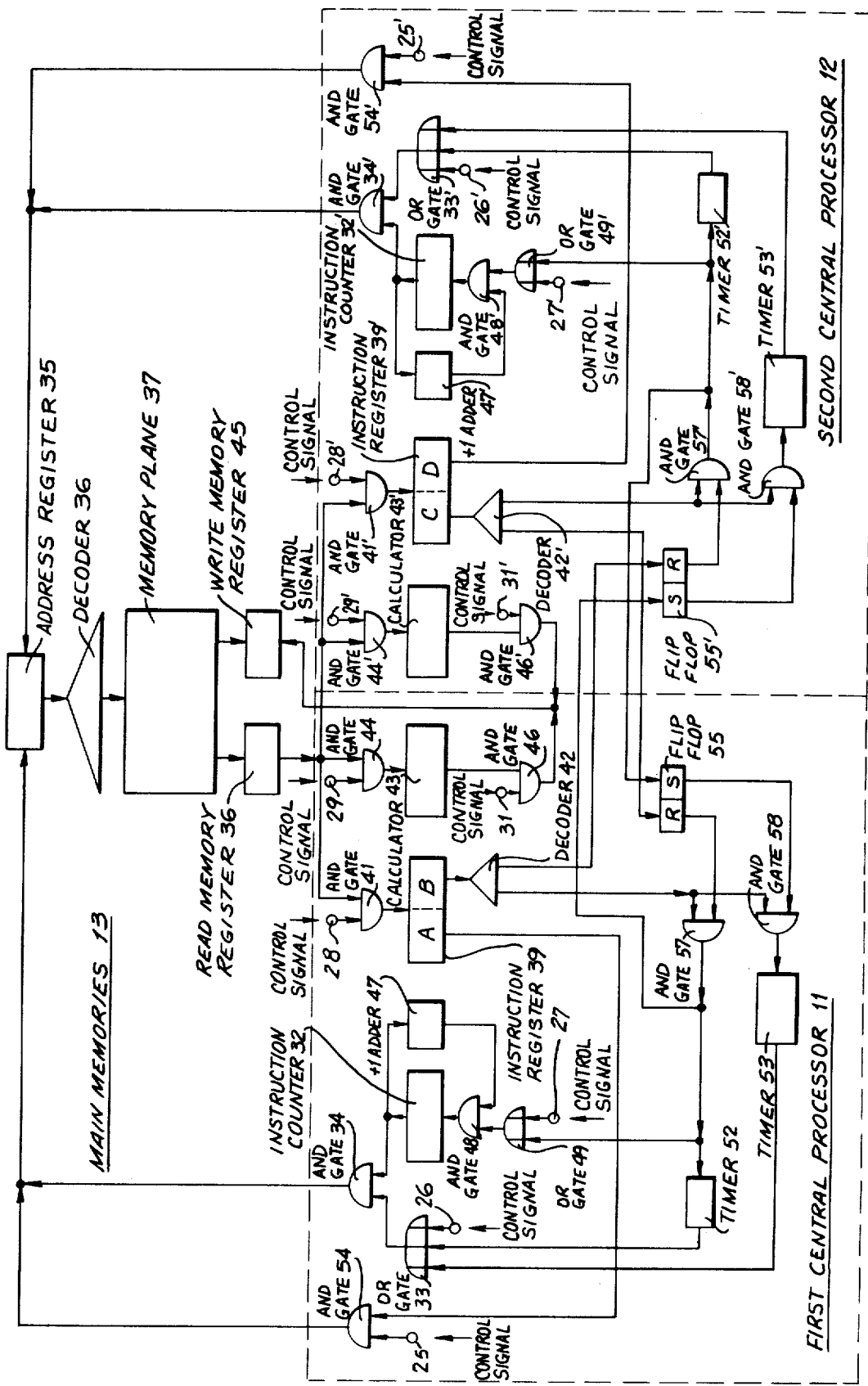
FIG. 5 is a block diagram of another embodiment of the table lock processing system of the invention.

FIG. 5 illustrates another embodiment of the table lock system of the invention. In the embodiment of FIG. 5, no lock signal indication is provided in the control tables of FIG. 3. Whether or not any of the control tables 22a', 22b' and 22c' is being utilized is displayed, indicated, determined, detected, shown, or the like, by a flip flop 55 or a flip flop 56 (FIG. 5). If the flip flop 55 or the flip flop 56 is set, this indicates that the control table 22a' (FIG. 3) is being utilized. If the flip flop 55 or 56 is reset, this indicates that the control table 22a' (FIG. 3) is not being utilized.

It is assumed, as in the case of FIG. 4, that the control program 21a' (FIG. 3) is executed by the first central processor 11. The operation of the circuit of FIG. 5 between the steps O and P–2 of the program 21a' (FIG. 3) is exactly the same as that of the circuit of FIG. 4. In the step P–1, the instruction of said step is read out of the memory plane 37 and is set in the instruction register 39. The decoder 42 determines that this instruction or order is an instruction or order to utilize the control table 22a' and transfers signals to an AND gate 57 and an AND gate 58. If the control table 22a' is not being utilized by the other central processor or the channel device at such time, the flip flop 55 is in its reset condition. The AND gate 57 is switched to its conductive condition by the reset output signal of the flip flop 55 and the signal from the decoder 42.

The signal transferred by the AND gate 57 in its conductive condition switches the OR gate 49 to its conductive condition and switches the AND gate 48 to its conductive condition. The address of the step P, which is available by adding +1 to the address of the step P–1, is set in the instruction counter 32. The signal from the AND gate 57 starts the timer 52 and also sets the flip flop 55' of the second central processor 12 to display, indicate, determine, or the like, the utilization of the control table 22a' by the first central processor 11.

The timer 52, in the same manner as the timer 52 of FIG. 4, produces an output signal after a constant period of time has passed after the starting thereof. The output signal produced by the timer 52 switches the OR gate 33 and the AND gate 34 to their conductive condition and sets the address of the step P in the address register 35. The following operations are the same as the operations of FIG. 4, except that after the execution of the instruction of the step Q–1 of the control program 21a' (FIG. 3), the flip flop 55' is reset by the signal from the decoder 42.

If the other central processor is utilizing the control table 22a' when the instruction of the step P–1 of the control program 21a' (FIG. 3) is set in the instruction register 39, the flip flop 55 is in its set condition. The AND gate 58 is switched to its conductive condition by the set output signal of the flip flop 55 and the signal from the decoder 42. As in FIG. 4, the timer 53 is then started. The timer 53 produces an output signal after a constant period of time. The output signal of the timer 53 switches the OR gate 33 and the AND gate 34 to their conductive conditions. At such time, the indication of the instruction counter 32 has not been renewed, but indicates the address of the step P–1.

When the AND gate 34 is switched to its conductive condition, therefore, the address of the step P–1 is set in the address register 35 and the instruction of said step is read out again from the memory plane 37 and is set in the instruction register 39. In this case, since the other central processor is not utilizing the control table 22a' (FIG. 3), the flip flop 55 is in its reset condition, and the instructions of the step P and the subsequent steps may be executed by the utilization of said control table.

If, at such time, the flip flop 55 is still in its set condition, the timer 53 is again started and after a constant period of time, the instruction of the step P–1 is again executed. Although the execution of the control program 21a' (FIG. 3) by the first central processor 11 has been hereinbefore described, said control program may be executed by the second central processor 12 and the channel device 14 (FIG. 1) in exactly the same manner. The other control programs 21b' and 21c' (FIG. 3) may also be executed in the same manner.

Each of the components of the first central processor 11 is the same as each of the corresponding components of the second central processor 12, in each of FIGS. 4 and 5, and the corresponding components are similarly numbered, with the corresponding number of the second central processor being primed. Each of the components of FIGS. 4 and 5 may comprise any suitable circuit or device for performing the indicated functions. Each of the components of FIGS. 4 and 5 is illustrated and described in "Digital Computer Fundamentals" by Thomas C. Bartee, second edition, McGraw-Hill Book Company, 1960, 1966, pages 80 to 83, 94 to 96, 100, 101, 159, 160, and 223 to 229.

While the invention has been described by means of specific examples and in specific embodiments, we do not wish to be limited thereto, for obvious modifications will occur to those skilled in the art without departing from the spirit and scope of the invention.

We claim:

1. In a multiprocessor type information processing system having a plurality of processors controllable by control programs utilizing control tables in their execution, a processing system comprising indicating means for indicating whether a control table utilized in the execution of a control program is being utilized by a processor, each of said processors including checking means for initially checking the indication of the indicating means when a processor is to utilize a control table and permitting means for permitting the utilization of the control table when the checking result indicates that the control table is free from utilization by another processor.

2. In a multiprocessor type information processing system as claimed in claim 1, wherein the indicating means comprises a lock signal indication in each control table.

3. In a mutliprocessor type information processing system as claimed in claim 1, wherein the indicating means is included in each of the processors.

4. In a multiprocessor type information processing system as claimed in claim 1, wherein the indicating means comprises flip flop means in each of the processors, the state of the flip flop means being determined by the condition of use of the control table by the other processors.

References Cited

UNITED STATES PATENTS

| | | | |
|---|---|---|---|
| 3,573,736 | 4/1971 | Schlaeppi | 340—172.5 |
| 3,328,765 | 6/1967 | Amdahl et al. | 340—172.5 |
| 3,405,394 | 10/1968 | Dirac | 340—172.5 |
| 3,469,239 | 9/1969 | Richmond et al. | 340—172.5 |
| 3,528,061 | 9/1970 | Zurcher, Jr. | 340—172.5 |
| 3,528,062 | 9/1970 | Lehman et al. | 340—172.5 |

PAUL J. HENON, Primary Examiner

M. B. CHAPNICK, Assistant Examiner